United States Patent [19]
Lowe et al.

[11] Patent Number: 4,930,243
[45] Date of Patent: Jun. 5, 1990

[54] ANGLING BITE DETECTOR

[76] Inventors: Martin C. Lowe, 104 Moston Road, Shrewsbury, Shropshire; Alan T. Lowe, Copperfield, The Crest, Old Park, Telford, Shropshire TF3 4TJ, both of United Kingdom

[21] Appl. No.: 375,635
[22] Filed: Jul. 5, 1989

[30] Foreign Application Priority Data

Jul. 8, 1988 [GB] United Kingdom ............... 8816259

[51] Int. Cl.$^5$ ............................................. A01K 97/12
[52] U.S. Cl. ...................................................... 43/17
[58] Field of Search .......................... 43/15, 16, 17, 25

[56] References Cited

U.S. PATENT DOCUMENTS

| | | | |
|---|---|---|---|
| 3,624,689 | 11/1971 | Rizzo | 43/17 |
| 4,399,631 | 8/1983 | Smith | 43/17 |
| 4,418,489 | 12/1983 | Mathauser | 43/17 |
| 4,586,284 | 5/1986 | Westwood | 43/17 |
| 4,625,446 | 12/1986 | Morimoto | 43/17 |
| 4,700,501 | 10/1987 | Bryan | 43/25 |
| 4,709,500 | 12/1987 | Yasumiishi | 43/17 |
| 4,766,688 | 8/1988 | Hiles | 43/17 |

*Primary Examiner*—M. Jordan
*Attorney, Agent, or Firm*—Diller, Ramik & Wight

[57] ABSTRACT

The detector comprises a vibration or shock emitter (2) which is adapted to be fitted at the top of a fishing rod (1) and when actuated by the movement of the tip of the rod caused when a fish bites, sends vibration or shock signals along the rod. The detector further comprises a receiver (3) adapted to be situated in direct or indirect contact with the rod at a distance from the emitter and containing an electronic circuit including a sensor (S1) which receives the signals travelling from the emitter along the rod and converts them to electric signals which are processed in the circuit and used to actuate acoustic and/or visual warning means (L1,S2) for alerting the angler, whereupon the circuit resets itself after a predetermined time.

12 Claims, 3 Drawing Sheets

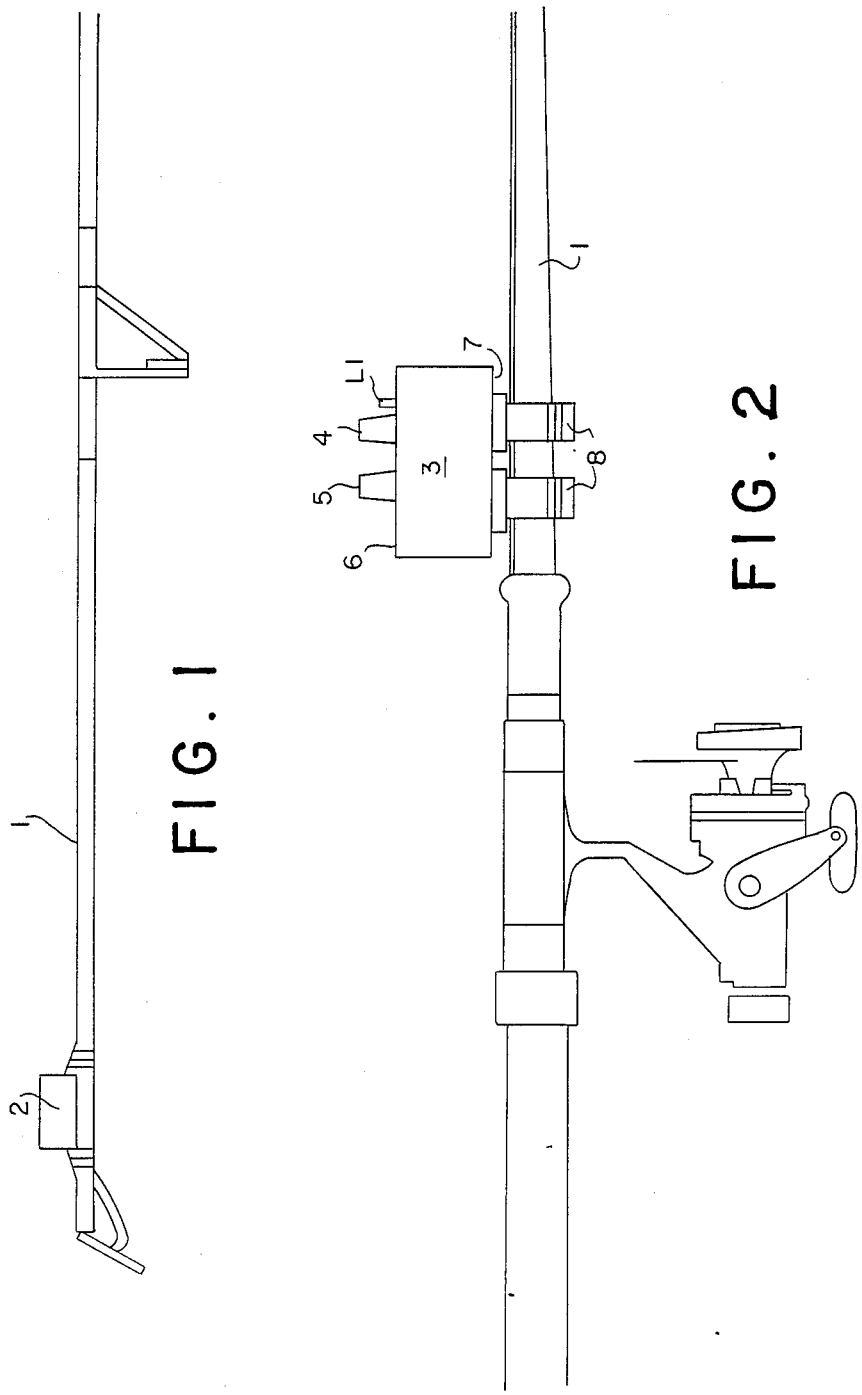

ANGLING BITE DETECTOR

BACKGROUND OF THE INVENTION

The invention relates to an angling bite detector.

Bite detectors are well known devices used to give an angler warning that a fish is taking the bait so that he is ready to strike the hook home at the desired time.

The most common bite detectors used are simple devices that clip onto the tip of the fishing rod, such was bells and the like, which rattle when the tip of the rod is jerked suddenly by a biting fish.

The main drawback of these types of clip-on sounders is that they have to be fitted to the tip of the rod after every cast and removed again before an angler can strike at a biting fish. If the device is not removed before a strike then the device usually flies off the tip of the rod behind the angler and causes the line to tangle around the device spelling disaster and mayhem for the angler.

Having to remove the device each time before striking usually means that by the time the rod is lowered and the device is removed, the fish is long gone.

Another simple well known device used by anglers is a clip-on light which fits at the tip of the rod to allow the angler to see the tip when fishing in darkness. The main drawback of this device is that the tip of the rod must be constantly watched by the anlger who must then try and determine which of the movements are bites and which are caused by other reasons, such as wind movement or tide pull. In most cases the device still has to be removed before striking can take place.

Presently available bite detectors can indicate in one way or another that a bite is occuring but most do so by monitoring the line rather than the movement of the tip of the rod. This may be satisfactory for catching some fish but not others.

SUMMARY OF THE INVENTION

The aim of the invention is to give the angler a much more efficient detector which can accurately monitor rod tip movement and/or line pull.

The invention provides a bite detector comprising an emitter of vibration or shock signals adapted to be fitted at the top of a fishing rod and to generate the signals when actuated by the movement of the tip of the rod caused when a fish bites, and further comprising a receiver adapted to be in contact with the rod at a distance from the emitter and containing an electronic circuit which receives the signals travelling from the emitter along the rod, and uses them to actuate acoustic and/or visual warning means for alerting the angler and then resets itself.

The invention will now be described, by way of example, with reference to the accompanying diagrammatic drawings, in which:

BRIEF DESCRIPTION OF THE DRAWINGS

FIG. 1 shows a first emitter attached to a fishing rod,

FIG. 2 shows a receiver attached to a fishing rod,

DESCRIPTION OF THE PREFERRED EMBODIMENTS

Figure 3:
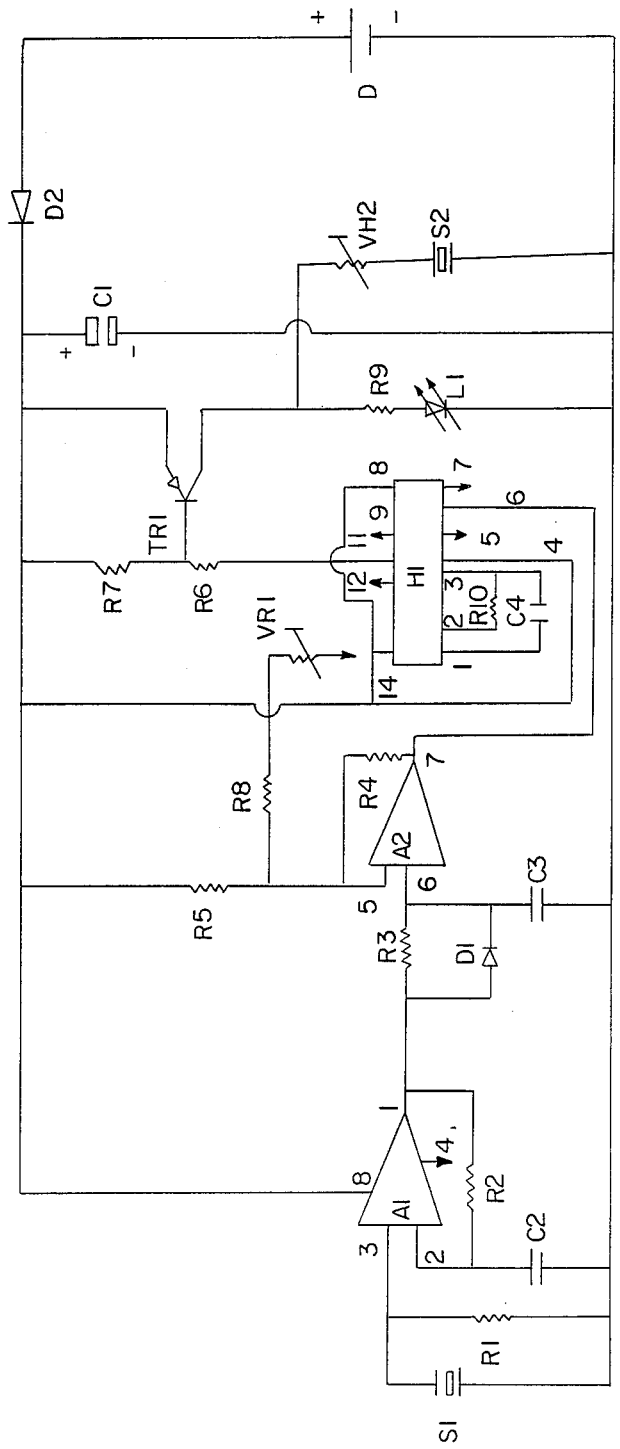
FIG. 3 shows a circuit inside the receiver.

FIG. 1 illustrates the top part of a fishing rod 1 at the tip of which is attached an emitter 2. FIG. 2 illustrates a lower part of the same fishing rod 1 to which is attached a receiver 3.

In the illustrated example the emitter 2 is a sensing device sensing movements of the tip of the rod 1. The emitter 2 comprises a hollow cylindrical capsule inside which is situated a freely moveable weight (not shown) which, when the tip of the rod 1 is suddenly moved, strikes against the inner wall of the capsule thereby generating a shock frequency which travels along the rod 1 because the emitter 2 is firmly connected to the rod 1. The generated shock frequency is a frequency to which is tuned the receiver 3.

The receiver 3 has the form of a box which comprises an electronic circuit which contains a dual operational amplifier composed of two amplifiers A1 and A2. The circuit also comprises a sensor S1 which is connected in parallel to the negative pole of a battery B and to a pin 3 of the amplifier A1. Also in parallel with the sensor S1 is connected a resistor R1. A pin 2 of the amplifier A1 is connected, via a capacitor C2, in series with the negative pole of the battery B. A resistor R2 is connected in parallel with pins 1 and 2 of the amplifier A1. Pin 4 of the amplifier A1 is connected to the negative pole of the battery B.

Pin 8 of the amplifier A1 is connected to the positive pole of the battery B, while pin 1 of the amplifier A1 is connected, via a resistor R3, to pin 6 of the amplifier A2.

A diode D1 is connected in parallel with a resistor R3. The output side of the diode D1 is connected, via a capacitor C3, to the negative pole the battery B.

Pin 5 of the amplifier A2 is connected to the positive pole of the battery B via a resistor R5. The same pin is also connected to the pin 7 of the amplifier A2 via a resistor R4, and further to the negative pole of the battery B via resistor R8 and a variable resistor VR1.

The circuit further comprises a monostable circuit M1. Pin 1 of the monostable circuit M1 is connected to pin 3 of that circuit via a capacitor C4. Pin 2 of the circuit M1 is connected to pin 3 of that circuit via a resistor R10. Pin 4 of the monostable circuit M1 is connected directly to the positive pole. Pin 5 of the monostable circuit M1 is connected to the negative pole while pin 6 of that circuit is connected to pin 7 of the amplifier A2.

Pin 7 of the monostable circuit M1 is connected to the negative pole while pin 8 of that circuit is connected to the pin 14 of that circuit. Pin 9 of the monostable circuit M1 is connected to the negative pole while pin 11 of that circuit is connected to the base of a transistor TR1 via a resistor R6.

Pin 12 of the monostable M1 is connected to the negative pole. Pin 14 of the monostable circuit M1 is connected in parallel to pin 8 and also directly to the positive pole.

The base of transistor TR1 is connected to the positive pole via a resistor R7. The collector of the transistor TR1 is connected to the positive pole, while the emitter of the transistor TR1 is further connected to the negative pole of the battery B on the one hand via a resistor R9 and a light emitting diode L1 and on the other hand via a variable restitor VR2 and a sounder S2.

A diode D2 is connected in series with the positive pole of the battery B and the rest of the circuit.

To the variable resistor VR1 is connected a first control button 4 and to the variable resistor VR2 is connected a second control button 5. Both the buttons are situated at the front face 6 of the receiver box and serve also as ON-OFF switches. The first button 4 is used to adjust the sensitivity of the receiver and the second button 5 is used to adjust the volume of the sounder S2. In the illustrated example the circuit has also a visual warning device, namely the light emitting diode L1, which is also situated on the front face 6 of the receiver box.

To the rear face 7, formed by a renewable, water-tightly attached lid, are attached fixing means, in the illustrated example two adjustable nylon clips 8.

Figure 4:
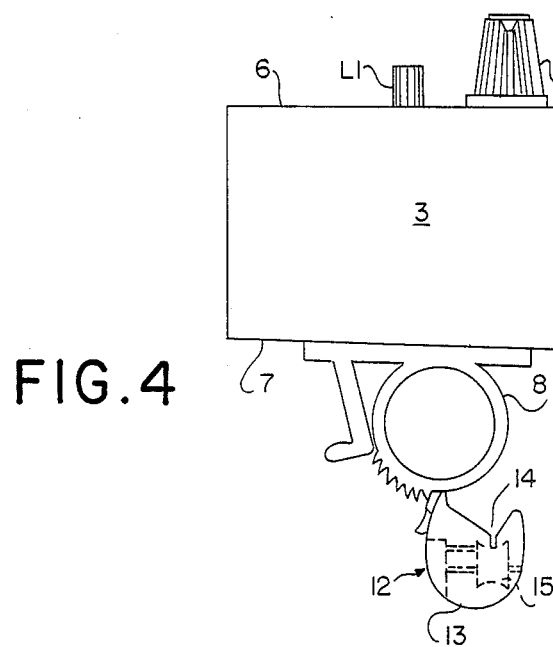
FIG. 4 is an end view of the receiver and second emitter.
Figure 5:
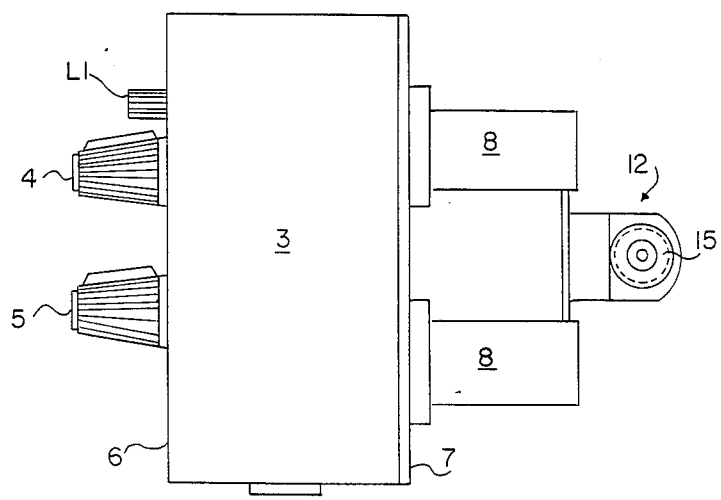
FIG. 5 is a side view of the receiver and second emitter.

FIGS. 4 and 5 show a second emitter 12 according to the invention attached to the clips 8. The second emitter 12 comprises a housing 13 provided with a recess 14 below which is situated a rotatable wheel 15 which is so positioned that in use it is in contact with the fishing line (not shown) such that pulling of the fishing line causes vibration or shock signals within the emitter 12. In the illustrated example the wheel 15 has on one side a ring of equiangularly spaced laterally extending pegs engaging with a finger so that, when the wheel 15 is rotated by friction between its surface and the line pulled by a fish, vibration is caused which is detected by the receiver 3 and thereby warning is given to the angler in the manner discussed.

Only one embodiment of the emitters 2 and 12, of the receiver 3 and of the fishing rod 1 were described. It will be understood that the described devices and their application could be modified in a number of ways.

So, for instance, the receiver 3 need not be fitted to the rod 1 itself but may be fitted to any auxiliary fishing equipment, e.g., a rod rest, with which the rod 1 is in contact. The emitter and receiver could be connected by a special connector, e.g. a wire, rather than by the fishing rod, but the use of the rod for the interconnection is preferable.

So far both the emitters 2 and 12 and the receiver 3 were described as external devices and they can be used in this form either for hollow or solid type rods. The emitters and detector may also be used as internal devices, i.e. devices mounted inside a hollow rod or some can be internal and some external. Naturally they could either be fixed to the rod, or auxiliary device that is in direct contact with the rod at the time of use, either permanently or temporarily, while the rod may be of any type for either salt water or fresh water.

In a preferred embodiment of the internally used receiver, the receiver may be mounted in the handle of a hollow translucent rod made e.g. of fibre glass in which case the handle acts as both holder and protector of the receiver which has a cylindrical housing fitting into the handle. In this way the detector and the fishing rod become a single combined unit which enables the removal or at least the opening of the receiver for the replacement of the battery.

The receiver 3 is so designed that while its sensor detects the signal generated by one of the emitters, this signal is processed in the circuit and the receiver 3 gives out an audible sound and/or a visual display for a predetermined time whereupon the circuit is automatically reset until another activation occurs to alert the angler that a bite is taking place.

The combination of the rod and a bite detector according to the invention allows the rod to be illuminated for a predetermined time on each activation of the detector. With the use of one or more light emitting diodes, fibre optics or filament lamps, which could be mounted anywhere on or in the rod. In a preferred embodiment illumination of a translucent rod is used by fitting the illuminating means at the half junction of the rod where the top of the rod joins the bottom. Projecting the light of one said illuminating means down the rod and that of the other up the rod causes that the whole length of the rod is illuminated on activation of the detector.

In a preferred embodiment the detector is designed to ignore any rod movements that are not sudden, such as those caused by wind or water movement. This means that the detector does not monitor movements of the rod which have no significance for the fisherman. There is no activation when the rod merely bends in any direction, whatever the degree of bending, but activation takes place when the tip movement is sudden regardless of the position of tip of the rod when this occurs.

The electronic circuit board could be potted in a potting compound to seal the unit completely against water and corrosion. The circuit can detect vibration or shock and differentiate between narrow bends of vibration or shock levels. This could be achieved in various ways. The sensor may be in the form of, or incorporate a quartz or piezo crystal which reacts similar to a tuning fork. Alternatively, the sensor may comprise an electromagnetic coil or a microphone device capable of detecting the noise generated by the emitter. When the sensor receives the correct vibration or shock level from one of the emitters, the sensor generates a small amount of current and/or changes its resistance value, which in turn causes an electrical change inside the integrated circuit which is then processed to give the described visual and/or audible warning.

The detector could have an ON OFF switch in the form of a reed switch on the circuit board when the latter is fitted inside the handle of the fishing rod, and a magnet on a rotary clip externally on the handle. This eliminates the possibility of water or corrosion entering the electronic circuit and switch. The reed switch can be used both for internal and external detectors. When the magnetic clip is brought into line with the internal reed switch, the reed switch closes and allows the battery power to reach the detector switching it on, and when rotated in the opposite direction moves the magnet away from the reed switch causing the reed switch to open and break the power supply from the battery to the detector whereby the latter is switched off.

It will be understood that the second emitter may be of any design which has an element actuated by the movement of a fishing line to cause directly or indirectly vibration or shock that are detected by the receiver.

We claim:

1. An angling bite detector comprising a vibration or shock emitter which is adapted to be fitted at the top of a fishing rod and when actuated by the movement of the tip of the rod caused when a fish bites, sends vibration or shock signals along the rod, the detector further comprising a receiver adapted to be situated in direct or indirect contact with the rod at a distance from the emitter and containing an electronic circuit including a sensor which receives the signals travelling from the emitter along the rod and converts them to electric signals which are processed in the circuit and used to actuate acoustic and/or visual warning means for alerting the angler, whereupon the circuit resets itself after a predetermined time.

2. A detector according to claim 1 wherein the emitter is in the form of a hollow capsule containing a freely movable weight.

3. A detector according to claim 1 wherein the sensor is a shock receiving or inertia detecting device.

4. A bite detector according to claim 1 wherein the sensor is a quartz crystal, a piezo crystal, or an electromagnetic coil.

5. A detector according to claim 1 wherein the sensor is a microphone device capable of detecting the noise generated by the emitter.

6. A detector according to claim 1 wherein the receiver is enclosed in a housing.

7. A detector according to claim 1 comprising a second emitter adapted to be actuated by a fishing line.

8. A detector according to claim 1 wherein the receiver comprises means for its attachment to a fishing rod or a rod rest.

9. A fishing rod comprising a detector according to claim 1.

10. A fishing rod according to claim 1 wherein the receiver is situated in or on the fishing rod.

11. A fishing rod according to claim 9 wherein the first mentioned emitter is situated in or on the fishing rod.

12. A fishing rod according to claim 10 wherein the first mentioned emitter is situated in or on the fishing rod.

* * * * *